United States Patent Office 2,893,912
Patented July 7, 1959

2,893,912

ANTI-VIRAL COMPOSITION COMPRISING A CYCLIC GLYOXAL AND METHOD OF USE

Samuel J. Musser, Kalamazoo Township, Kalamazoo County, and Gerald E. Underwood, Charleston Township, Kalamazoo County, Mich., assignors to The Upjohn Company, Kalamazoo, Mich., a corporation of Michigan No Drawing. Application April 30, 1956
Serial No. 581,271

12 Claims. (Cl. 167—30)

The present invention relates to novel chemical compositions having antiviral activity, particularly virucidal activity, and methods for their application, which compositions contain as the active ingredient a cyclic glyoxal, which term is defined in the present specification and claims as meaning compounds of the structural formula $$R-\overset{O}{\overset{\|}{C}}-\overset{O}{\overset{\|}{C}}-H$$
I wherein R is selected from Cyclopentyl [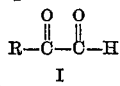CH—], cyclohexyl [($CH_2$)$_5$CH—]

Benzyl $C_6H_5CH_2$—], furyl 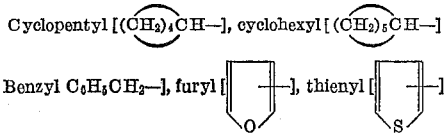, thienyl […—]

and substituted phenyl having substitution selected from hydroxy [HO—], dihydroxy, methoxy [$CH_3O$—], dimethoxy, hydroxy and methoxy, carboxy [$HO_2C$—], carbomethoxy [$CH_3O_2C$—], nitro [$O_2N$—], chloro [Cl—], and bromo [Br—]; and sodium and potassium bisulfite addition compounds thereof. The hydrates of the foregoing active ingredient compounds also are included within the scope of the present invention.

The novel compositions of the present invention, containing the above-defined active ingredient which has been discovered to have virucidal activity, are of two basic types designated as compositions A and B. Composition A comprises (1) active ingredient, (2) fluid carrier being a liquid or gas, and (3) surface-active agent. Composition B comprises (1) active ingredient and (2) solid carrier, preferably with a surface-active agent added. When the fluid carrier in composition A is a sterile aqueous solvent, the addition of a surface-active agent is preferred but not required. Suitably the compositions can be used in the solid state, e.g. as a dust, powder, granules, pellets, tablets, etc., in the liquid state, e.g. as a solid-in-liquid suspension or solution or a liquid-in-liquid emulsion or solution, as an aerosol of solid or liquid in a propellant gas, or in the gaseous state.

The antiviral compositions of the present invention are particularly useful for killing viruses other than when present in the normal virus-host relationship in animals. They are particularly useful for virus prophylaxis and decontamination of materials and areas. For example, viruses such as Newcastle's virus can be substantially eliminated from poultry growing areas contaminated with such viruses by application of the compositions of the present invention. Uncontaminated poultry-growing areas can be treated with the present compositions as a prophylactic measure to prevent virus contamination. Similarly sick rooms, hospital equipment such as surgical instruments, etc. can be maintained substantially free of the many possible contaminating viruses, e.g. influenza, mumps, hepatitis, measles, etc. viruses, by application of the present compositions, composition A being most useful for this purpose when the fluid carrier is sterile aqueous solvent, with or without surface-active agent. The compositions of the present invention are suitable for the virus decontamination of any virus-infected geographical area, small or large, e.g., as would be present in biological warfare employing viruses. Paper, cloth, wood, etc. can be treated with the present compositions as a prophylactic measure to prevent virus contamination. Other uses of the antiviral compositions of the present invention will be apparent to one skilled in the art. Efficacy of the present antiviral compositions is illustrated by Table I which shows the typically superior results of representative active ingredient compounds of this invention obtained in the well-known in ovo survival test for antiviral potency, employing Newcastle's virus (NJ-KD strain) and influenza A virus (PR8 strain) as illustrative viruses. In the test method used to obtain the data in Table I any particular

TABLE I

| Test Compound | | Protective Index | |
|---|---|---|---|
| Formula | Milligrams per egg | Newcastle's Virus | Influenza A Virus |
| $CH_2(CH_2)_3CH-CO-CHO$ | 2.0 | 78, 73 | 42 |
| $CH_2(CH_2)_4CH-CO-CHO\cdot\frac{1}{2}H_2O$ | 1.0 | 84, 68 | |
|  | 2.0 | 73 | 77 |
|  | 1.0 | 73, 87 | |
| $CH_2(CH_2)_4CH-CO-CHO\cdot NaHSO_3\cdot H_2O$ | 1.4 | 79 | |
|  | 2.0 | | 64 |
| $C_6H_5-CH_2-CO-CHO\cdot NaHSO_3\cdot H_2O$ | 6.0 | | 61 |
|  | 8.0 | 99 | |
| para-$HO-C_6H_4-CO-CHO$ | 1.0 | 78, 68 | 77 |
|  | 3.0 | 76 | 49 |
| para-$HO-C_6H_4-CO-CHO\cdot NaHSO_3$ | 6.0 | 81 | |
| 4-$HO-(3-CH_3O)-C_6H_3-CO-CHO\cdot H_2O$ | 1.0 | 79 | 46 |
|  | 2.0 | 99, 86 | 67 |
| meta-$CH_3O-C_6H_4-CO-CHO\cdot NaHSO_3\cdot\frac{1}{2}H_2O$ | 6.0 | 91 | |
| para-$CH_3O-C_6H_4-CO-CHO\cdot NaHSO_3$ | 2.0 | 58 | |
|  | 2.0 | | 79 |
| para-$Cl-C_6H_4-CO-CHO\cdot NaHSO_3$ | 4.0 | 99, 99 | |
| para-$Br-C_6H_4-CO-CHO\cdot NaHSO_3$ | 2.0 | 73, 88 | 84 |
| para-$HOOC-C_6H_4-CO-CHO\cdot H_2O$ | 8.0 | 90, 76 | |
| para-$HOOC-C_6H_4-CO-CHO\cdot NaHSO_3$ | 10.0 | 77 | |
| para-$CH_3OOC-C_6H_4-CO-CHO\cdot H_2O$ | 0.5 | | 51 |
| para-$CH_3OOC-C_6H_4-CO-CHO\cdot NaHSO_3$ | 2.0 | 99, 99 | 79 |
| para-$O_2N-C_6H_4-CO-CHO\cdot H_2O$ | 1.0 | 43 | |
| $O-CH=CH-CH=C-CO-CHO\cdot H_2O$ | 4.0 | 81, 87 | |
|  | 6.0 | 90 | 65 |
| $S-CH=CH-CH=C-CO-CHO\cdot H_2O$ | 2.0 | 35 | | test compound, i.e. active ingredient, is dissolved in water or suspended in water-carboxymethyl cellulose, depending on the degree of water solubility. A known volume of such a solution or suspension containing a known concentration of the test compound is injected into the allantoic sac of ten day fertile eggs, using the technique described by Beveridge and Burnet, Medical Research Council, Special Report Series No. 256, "The Cultivation of Viruses and Rickettsiae in the Chick Embryo," London, His Majesty's Stationery Office, 1946. The test compound is usually administered at or slightly less than the maximum tolerated dose, i.e., the greatest amount which when similarly administered is found to cause no deaths in similar eggs during a 216-hour incubation period. The same volume of the same menstruum without test compound is injected into similar eggs as a control. About fifteen minutes later all eggs, test and control, are inoculated with a virus suspension containing approximately fifty times the $LD_{50}$ dosage of virus; one $LD_{50}$ is that amount which kills fifty percent of virus infected embryonated eggs. The eggs are incubated at 37 degrees centigrade. Survivorship is determined by candling the eggs at eight-hour intervals during a 216-hour period. The protection afforded by a test compound is conveniently expressed thus: percent survivorship of treated eggs after 216 hours (e.g. ninety percent) minus percent survivorship of control eggs after 216 hours (e.g. five percent) equals the protective index (e.g. 85), the maximum protective index value being 100. The test compounds listed in Table I, therefore, are highly potent antiviral agents.

An object of the present invention is to provide novel chemical compositions having antiviral activity, particularly virucidal activity, and methods for the application of such compositions. Another object of the present invention is to provide novel compositions having virucidal activity and containing as the active ingredient previously defined a cyclic glyoxal and more particularly a low-molecular-weight cyclic glyoxal, and novel processes for the application of these compositions. A further object of this invention is to provide antiviral compositions comprising (1) active ingredient as defined previously and (2) an additional ingredient selected from (a) fluid carrier plus surface-active agent, and (b) solid carrier. An additional object of the present invention is to provide virucidal compositions having the specific utilities stated above, as well as other utility as antiviral agents. Other objects of the present invention will be apparent to one skilled in the art.

Representative cyclic glyoxals of the present invention are cyclopentyl-, cyclohexyl-, cycloheptyl-, β-decahydronaphthyl-, 1-acenaphthenyl-, cyclopentylmethyl-, α and β-cyclohexylbutyl-, ω-cyclopentylhexyl-, α and β-cyclohexylisopropyl-, 1-cycloheptenyl-, 1-cyclopentenyl-, β-(1-cyclohexenyl)-ethyl-, ω-(1-cyclopentenyl)-propyl-, 2-furyl, 2-thienyl-, β-pyridyl-, 3-indolyl-, 2-morpholyl-, β-thionaphthenyl-, ω-(2-furyl)-ethyl-, ω-(2-furyl)-hexyl-, α and β-naphthyl-, α and β-naphthylmethyl-, β-phenylethyl-, β-phenylisopropyl-, α-phenylethyl-, 3-hydroxy-1-cyclohexyl-, 3-acetoxy-1-cyclohexyl-, 3-chloro-1-cyclohexyl-, 3-bromocyclohexyl-, 2-acetylamino-1-cyclopentylmethyl-, 3-nitro-2-furyl-, 3-cyano-2-furyl-, 2-nitromethyl-2-furyl-, 4-carboxy-2-pyridyl-, 4-carbethoxy-2-pyridyl-, 4-carbamyl-2-pyridyl-, 1-acetyl-3-indolyl-, 4-amino-2-naphthyl-, 4-fluoro-2-naphthyl-, 4-hydroxymethyl-2-naphthyl-, 4-trichloromethyl-2-naphthyl-, 4-mercapto-2-naphthyl-, 4-methylmercapto-2-naphthyl-, 4-sulfo-2-naphthyl-, 4-iodo-2-naphthyl, 4-ethylsulfonyl-2-naphthyl, 4-methoxyphenyl-, 4-propenylphenyl-, mesityl-, 4-iodophenyl-, 4-carboxymethylphenyl-, 4-cyanomethylphenyl, 2-(β-hydroxyethyl)-phenyl-, 3-chloromethylphenyl-, 3-dichloromethylphenyl-, 4-(β-nitroethyl)-phenyl-, 3,4-methylenedioxyphenyl-, 4-formylphenyl-, 4-fluoromethylphenyl-, 4-bromoethylphenyl-, 4-glyoxylphenyl-, 4-sulfamylphenyl-, 3-selenonophenyl-, 4-isothiocyanophenyl-, 4-phosphonophenyl-, 4-sulfaminophenyl-, 4-carbamidophenyl-, 4-arsonophenyl-, 4-chloromercuriphenyl-, 4-thiocyanophenyl- and 4-methoxybenzyl-glyoxal; and sodium and potassium bisulfite addition compounds and hydrate derivatives thereof. The active ingredient can be employed in the compositions of the present invention in an amount up to fifty percent by weight or more. However, concentrations of 0.001 percent to ten percent and preferably 0.1 percent to five percent by weight are normally employed.

Typical liquid fluid carriers are water and oils, including those of petroleum, animal, vegetable or synthetic origin, e.g. kerosene, fuel oil, lubricating oil, soy bean oil, linseed oil, castor oil, sperm oil, cod liver oil, etc., particularly those liquid fluid carriers known in the spraying arts, e.g. vegetation spraying, insect spraying, etc. In general water is a suitable, economical, and preferred liquid fluid carrier. Typical gaseous fluid carriers are polyhalogenated hydrocarbons containing one or more fluorine atoms, i.e. the Freons e.g. the preferred dichlorodifluoromethane ($CCl_2F_2$), i.e. Freon 12, carbon dioxide, nitrogen, propane, etc., particularly those known in the aerosol arts, e.g. insecticide and other pesticide aerosol carriers, etc. Typical solid carriers are clays, e.g. fuller's earth, pyrophyllite, talc, bentonite, kieselguhr, diatomaceous earth, or other clays commercially available in finely divided forms, etc., particularly those which are employed in the art as insecticide and other pesticide carriers. Typical sterile aqueous solvents are sterile water (preferred), sterile isotonic salt (sodium chloride) solution, sterile aqueous ethanol, etc., particularly those sterile aqueous solvents which are known in the art to be useful in sterile disinfectants used for sterilization of surgical instruments and other hospital and medical equipment, supplies, furniture, clothing, etc. Typical surface-active agents [Kirk and Othmer, "Encyclopedia of Chemical Technology," Interscience Publishers, Inc., New York, New York, 1954, volume 13, page 513], particularly emulsifying and dispersing agents, are, e.g. fatty alcohol sulfates such as sodium lauryl sulfate, aliphatic or aromatic sulfonates, such as sulfonated castor oil or the various alkylarylsulfonates such as the sodium salt of monosulfonated nonyl naphthalene, and non-ionic types of emulsifying or dispersing agents such as the high molecular weight alkyl polyglycol ethers or analogous thio ethers, such as the decyl, dodecyl, and tetradecyl polyglycol ethers and thioethers containing from 25 to 75 carbon atoms, etc., particularly those surface-active agents known in the pesticide art. For purposes of preparing satisfactory emulsions or dispersions an amount of surface-active agent 0.01 percent to five percent by weight of the composition is normally suitable. However, for adjuvant purposes an amount of surface-active agent up to 200 percent or more by weight of the amount of active ingredient can be used. Typical adjuvants which suitably may be added to the fore-described compositions of this invention, particularly the aqueous compositions, are wetting agents and/or humectants. Suitable wetting agents are, e.g. the previously described emulsifying and dispersing agents and suitable humectants are, e.g. glycerine, diethylene glycol, ethylene glycol, polyethylene glycols in general, glucose, fructose, corn syrup, etc. Other adjuvants may be added to prevent lumping of solid compositions during storage, or to obtain increased coverage or adherence of the composition on application. Likewise fungicides, insecticides, bactericides, and other anti-infective agents, e.g. phenols, cresols, antibiotics, etc., suitably may be added to the compositions of the present invention. Moreover, the compositions of the present invention can be combined with paint compositions which provides paint surfaces having virucidal properties when applied. The compositions of the present invention are formulated by mixing the active ingredient with the other specified components. Frequently it is preferred to prepare the composition at the place and time of application, particularly if an aqueous liquid carrier is used in order to avoid transporting and storing large volumes of the compositions, or when the composition is not stable for long periods, or requires reconstitution prior to use. For example, dusts for use in the well-known dusting art can be prepared by grinding solid ingredients together, or grinding separately with subsequent mixing, e.g. by tumbling together, or alternatively, the active material in liquid form, including solutions, emulsions, and suspensions thereof, can be admixed with a finely divided solid carrier in amounts small enough to preserve the requisite free-flowing property of the final dust composition, or excess liquid can be removed by vaporization, e.g. under reduced pressure. The powder can be formed into granules, pellets, tablets, etc., according to procedures well-known in the art, if desired, particularly for application of the composition to soil. For liquid compositions applicable by painting or spraying, the active ingredient is dissolved or dispersed in a liquid carrier by agitation, a surface-active agent being included when required as noted above, or when desired. Solid ingredients particularly if not water soluble, suitably can be dissolved or suspended in a solvent, and then emulsified with an aqueous liquid carrier. Sterile aqueous compositions of the present invention can be prepared by mixing sterile active ingredient, and other sterile ingredients, if desired, with sterile aqueous solvent under aseptic conditions. Alternatively a non-sterile composition can be prepared and subsequently sterilized. For aerosol compositions, propellant gas fluid carrier is mixed with the other solid or liquid ingredients specified above according to procedures well-known in the aerosol art. Suitably the compositions of the present invention can be used in the gaseous state as fumigant compositions.

The cyclic glyoxal active ingredient compounds of the present invention are prepared by prior art methods as illustrated in the examples.

The following examples are illustrative only and are not to be construed as limiting the scope of the present invention.

*Example 1*

To a solution of 16.7 grams (0.15 mole) of selenium dioxide in thirty milliliters of dioxane and ten milliliters of water is added 24.6 grams (0.15 mole) of para-acetylbenzoic acid and seventy milliliters of dioxane and ten milliliters of water are also added. The acid dissolves on heating. After heating under reflux with stirring for three and one-fourth hours, the mixture is cooled and filtered from black selenium [weight of selenium is nine grams (76 percent of the theoretical)]. Removal of the solvent gives a gelatinous residue which is taken up in boiling water and filtered. On cooling, an amorphous solid separates. The slightly damp product is dissolved in hot acetic acid and filtered. On cooling the product again separates, as an amorphous solid. It is collected on a filter and washed with acetic acid and then with methylene chloride. The product is dried in a vacuum desiccator, giving a tan colored solid which darkens at about 150 degrees centigrade, sinters at about 278 degrees centigrade, but is not completely melted at 300 degrees centigrade. The product is again taken up in boiling water, treated with decolorizing carbon and filtered. On cooling para-glyoxylbenzoic acid hydrate

[para-HO$_2$C—C$_6$H$_4$—COCHO·H$_2$O]

separates as an amorphous solid which is collected and dried, giving four grams of nearly white powder with no distinct melting point. The infrared spectrum is in agreement with the monohydrate structure. Titration by the hydrogen peroxide oxidation analysis method shows it to be ninety to 93 percent para-glyoxylbenzoic acid hydrate.

*Example 2*

To a suspension of six grams of crude para-glyoxylbenzoic acid (equivalent to 4.45 grams or 0.025 mole of pure compound according to hydrogen peroxide titration) in 35 milliliters of water is added 7.5 milliliters of aqueous sodium bisulfite solution (prepared from pure sodium carbonate and sulfur dioxide, and containing 0.025 mole of sodium bisulfite). The mixture is warmed and shaken for ten minutes and allowed to stand for three hours. To this mixture is added fifteen milliliters more water and the solid is dissolved by heating to the boiling point. On cooling and standing a mixture of yellow and white solid separates. This solid is collected, washed with water, and then shaken with 150 milliliters of methanol. The solid is collected, washed with methanol and dissolved in about 75 milliliters of hot water, again filtered, and cooled in the refrigerator. The para-glyoxylbenzoic acid sodium bisulfite addition compound

[para-HO$_2$C—C$_6$H$_4$—COCHO·NaHSO$_3$]

slowly separates and is filtered and dried; weight 3.13 grams. A sample titrated by the hydrogen peroxide method gives an equivalent weight of 70.3 (calculated equivalent weight 70.55).

*Example 3*

A mixture of 55.5 grams (0.5 mole) of selenium dioxide, 89.09 grams (0.5 mole) of methyl para-acetylbenzoate, forty milliliters of water, and 300 milliliters of dioxane is heated under reflux for five hours and allowed to stand overnight. The resulting crystalline mass is dissolved by adding fifty milliliters of dioxane and heating to the boiling point. The solution is filtered from the selenium which is washed with fifty milliliters of dioxane [weight of selenium 38 grams (98 percent of the theoretical amount)]. The filtrate gives crystals, 55.6 grams, on cooling. The crystals are dissolved in 350 milliliters of tetrahydrofuran and 650 milliliters of water, filtered, and boiled on a steam bath until crystallization starts. After cooling, the methyl para-glyoxylbenzoate hydrate [para-CH$_3$O$_2$C—C$_6$H$_4$—COCHO·H$_2$O] is collected, washed with water and dried in a vacuum desiccator, giving 52.7 grams of nicely crystalline, fluffy material; melting point 125–128 degrees centigrades with decomposition. A small sample recrystallized from water melts at 126 to 128 degrees centigrade with decomposition. Titration by the hydrogen peroxide oxidation method shows 99.1 percent purity calculated as the monohydrate.

*Analysis.*—Calcd. for C$_{10}$H$_{10}$O$_5$: C, 57.14; H, 4.80. Found: C, 57.29; H, 4.99.

*Example 4*

To a solution of 10.7 grams (0.05 mole) of methyl para-glyoxylbenzoate hydrate in 100 milliliters of ethanol at the boiling point is added fifteen milliliters of aqueous sodium bisulfite solution (prepared from pure sodium carbonate and sulfur dioxide, and containing 0.05 mole of sodium bisulfite). In a few seconds the addition product precipitates. This precipitate is dissolved by adding more water and boiling off some ethanol. On cooling, the methyl para-glyoxylbenzoate sodium bisulfite addition compound [para - CH$_3$O$_2$C—C$_6$H$_4$—COCHO·NaHSO$_3$] crystallizes and the crystals are collected, washed with methanol and dried in a vacuum desiccator, giving 12.5 grams (84.5 percent of the theoretical amount) of glistening crystals. Titration by hydrogen peroxide oxidation gives an equivalent weight of 97.0 (calculated equivalent weight 98.74).

*Example 5*

Cyclopentylmagnesium chloride is prepared in a one-liter flask from seventeen grams (0.7 mole) of magnesium, 73.3 grams (0.7 mole) of cyclopentyl chloride, and 250 milliliters of absolute ether. To this is slowly added 107.5 grams (0.5 mole) of diethoxyacetylpiperidide and 150 milliliters of absolute ether. After the addition is complete the mixture is stirred and heated under reflux for six hours and allowed to stand overnight. Then 400 milliliters of aqueous twenty percent ammonium chloride solution is slowly added, and after stirring for one hour the layers are separated. The aqueous slurry is extracted twice with ether and the combined ether solution is washed with water, and then with saturated sodium chloride solution. After drying over anhydrous sodium sulfate, the ether is removed and the product is distilled through a twelve inch (⅛ inch helices) column giving 90.2 grams (ninety percent of the theoretical amount) of cyclopentylglyoxal diethylacetal

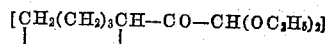

as a colorless liquid; boiling point ninety degrees centigrade at two millimeters pressure; $n_D^{25}$ 1.4388.

*Analysis.*—Calcd. for $C_{11}H_{20}O_3$: C, 65.97; H, 10.07. Found: C, 66.00; H, 10.19.

To forty grams (0.2 mole) of cyclopentylglyoxal diethylacetal is added 264 milliliters of ethanol, fifty milliliters of concentrated hydrochloric acid, and water to make the volume 500 milliliters. Samples are withdrawn from time to time, exactly neutralized to phenolphthalein end point with dilute sodium hydroxide, and then titrated by the hydrogen peroxide oxidation method. After 24 hours at room temperature the titration indicates 37 percent of the glyoxal. The temperature is increased to fifty degrees centigrade and the hydrolysis is contineud. After a total time of 29¾ hours, titration indicates 55.6 percent and thereafter the titration value drops, being 49.5 percent at thirty hours and 25 minutes. The brown solution is cooled to below zero degrees centigrade with Dry Ice and nearly neutralized by dropping in aqueous twenty percent sodium hydroxide solution. Then aqueous sodium bicarbonate solution is added to make it slightly basic. The mixture is extracted twice with methylene chloride and once with ether. The extracts are washed with aqueous sodium chloride solution and dried over anhydrous sodium sulfate. The solvent is removed and the product is distilled through a six inch (⅛ inch helices) column. After removing a small forerun the main fraction is collected at 47–56 degrees centigrade at twelve millimeters pressure, giving 8.86 grams (35.2 percent of the theoretical amount) of cyclopentylglyoxal

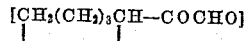

as a yellow liquid which titrates 86.4 percent by the hydrogen peroxide oxidation method.

*Example 6*

In a fifty-milliliter Erlenmeyer flask 1.5 grams (0.0090 mole) of para-hydroxyphenylglyoxal hydrate is dissolved in five milliliters of ethanol by warming and then a solution containing 1.04 grams (0.010 mole) of sodium bisulfite in three milliliters of water is added. The crystals which separate upon cooling are collected, washed with two milliliters of ethanol, and dried, giving 2.2 grams of product. One recrystallization from water and ethanol gives 1.9 grams of para-hydroxyphenylglyoxal sodium bisulfite addition compound

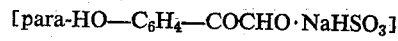

*Example 7*

In a 125-milliliter Erlenmeyer flask 3.46 grams (0.020 mole) of meta-methoxyphenylglyoxal is dissolved in twenty milliliters of ethanol by warming and a solution of 2.08 grams (0.020 mole) of sodium bisulfite in ten milliliters of water is added. The crystals which form are collected after cooling, washed with ten millileters of ethanol, and dried, giving 4.9 grams (91 percent of the theoretical amount) of meta-methoxyphenylglyoxal sodium bisulfite addition compound hemihydrate

After recrystallization twice from water and ethanol, the white crystals give the following correct analyses:

*Analysis.*—Calcd. for $C_9H_{10}NaO_{6.5}S$: C, 39.00; H, 3.95. Found: C, 39.05; H, 3.76.

*Example 8*

In a 125-milliliter Erlenmeyer flask 3.7 grams (0.020 mole) of para-chlorophenylglyoxal hydrate is dissolved in forty milliliters of tetrahydrofuran by slight warming and a solution of 2.0 grams (0.020 mole) of sodium bisulfite in twenty milliliters of water is added. There is immediate appearance of a dense milkiness. The mixture is allowed to digest at fifty to sixty degrees centigrade for thirty minutes, then allowed to cool and the white crystals collected, washed with tetrahydrofuran, and dried, giving 4.6 grams (84 percent of the theoretical amount) of the sodium bisulfite addition compound [para-Cl—$C_6H_4$—COCHO·$NaHSO_3$]. Titration with base after oxidation with hydrogen peroxide requires 3.03 equivalents of base per mole whereas the theoretical is 3.00. A 0.6-gram sample is recrystallized by dissolving in nine milliliters of warm water, then adding nine milliliters of ethanol which causes rapid crystallization, cooling, and collecting the precipitate.

*Example 9*

In a fifty-milliliter Erlenmeyer flask 1.82 grams (0.010 mole) of para-methoxyphenylglyoxal hydrate is dissolved in eight milliliters of ethanol by warming and the yellow solution is treated with a freshly prepared solution containing 1.04 grams (0.010 mole) of sodium bisulfite in five milliliters of water. The white platelets which separate on cooling are collected, washed with ethanol, and dried, giving 2.0 grams (seventy percent of the theoretical amount) of para-methoxyphenylglyoxal monosodium bisulfite addition compound monohydrate [para-$CH_3O$—$C_6H_4$—COCHO·$NaHSO_3$·$H_2O$]. After recrystallization from dilute ethanol the crystals give the following correct analyses:

*Analysis.*—Calcd. for $C_9H_{11}NaO_7S$: C, 37.77; H, 3.88. Found: C, 37.56; H, 3.58.

*Example 10*

A solution of 26.6 grams (0.16 mole) of acetomesitylene and 18.05 grams (0.16 mole) of selenium dioxide in 2.5 milliliters of water and 150 milliliters of dioxane is heated under reflux for five hours, filtered, and the solvent removed. The product, mesitylglyoxal

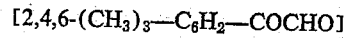

is distilled under reduced pressure; weight 20.6 grams; $n_D^{24}$ 1.5282. On standing in the refrigerator the product crystallizes; freezing point thirty degrees centigrade.

*Example 11*

Boiling mesitylglyoxal with a large volume of water and cooling, provides crystalline mesitylglyoxal hydrate

weight 19.5 grams, melting point ninety to 97 degrees centigrade. Recrystallization from moist chloroform gives five grams of product, melting point 97–98 degrees centigrade. From the filtrates an additional 10.2 grams of product is obtained by crystallization from water, melting point 95–98 degrees centigrade.

*Example 12*

In a 125-milliliter Erlenmeyer flask 1.94 grams (0.010 mole) of mesitylglyoxal hydrate is dissolved in 25 milliliters of ethanol by warming and the solution is treated with a solution of 1.04 grams (0.010 mole) of sodium bisulfite in ten milliliters of water. The white platelets which separate are collected and dried, giving 2.8 grams (100 percent of the theoretical amount) of mesitylglyoxal sodium bisulfite addition compound monohydrate [2,4,6-$(CH_3)_3$—$C_6H_2$—COCHO·$NaHSO_3$·$H_2O$]. Upon recrystallization twice from water there is obtained 0.7 grams of product.

*Analysis.*—Calcd. for $C_{11}H_{15}NaO_6S$: C, 44.30; H, 5.06. Found: C, 44.68, 44.40; H, 5.09, 4.84.

Example 13

Methyl 2-furyl ketone is oxidized by selenium dioxide according to the procedure of Arnfelt, J. Am. Chem. Soc., 70, 3949 (1948), to obtain 2-furylglyoxal

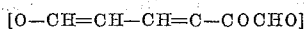

as a yellow oil boiling at 65–68 degrees centigrade at four millimeters' pressure.

Reaction of 2-furylglyoxal with water according to the Arnfelt procedures produces crystalline 2-furylglyoxal monohydrate melting at 68 to seventy degrees centigrade.

Example 14

Para-methoxyacetophenone is oxidized according to the Arnfelt process of Example 13, yielding 94 percent of the theoretical amount of precipitated selenium. The para-methoxyphenylglyoxal

[para-$CH_3O$—$C_6H_4$—COCHO]

is a hygroscopic yellow solid, boiling point ninety to 94 degrees centigrade at 0.08 millimeter pressure.

The hydrate is prepared by heating the above yellow solid with water on the steam bath and recrystallization from water; melting point 105 degrees centigrade (starts losing water at 75 degrees centigrade). The yield of crystallized product is 48 percent of theory, and assay by hydrogen peroxide oxidation indicates 95 percent para-methoxyphenylglyoxal hydrate

[para-$CH_3O$—$C_6H_4$—COCHO·$H_2O$]

Example 15

Meta-methoxyacetophenone is oxidized according to the Arnfelt process of Example 13, yielding ninety percent of theory of precipitated selenium. The meta-methoxyphenylglyoxal [meta-$CH_3O$—$C_6H_4$—COCHO] is a yellow oil, boiling point 95–98 degrees centigrade at 0.05 millimeter.

The meta-methoxyphenylglyoxal is hydrated by stirring in hot water. Recrystallization of the product from water followed by washing with Skellysolve A (mixture of pentanes and hexanes) gives a white crystalline product, melting point 98–101 degrees centigrade. Assay by hydrogen peroxide oxidation indicates 101 percent meta-methoxyphenylglyoxal hemihydrate

[meta-$CH_3O$—$C_6H_4$—COCHO·½$H_2O$]

*Analysis.*—Calcd. for $C_9H_9O_{3.5}$: C, 62.42; H, 5.24. Found: C, 62.30; H, 5.51.

Example 16

To a suspension of 88 grams (0.80 mole) of selenium dioxide in a mixture of 480 milliliters of dioxane and eighteen milliliters of water in a resin flask equipped with mechanical stirrer, thermometer, and reflux condenser is added 160 grams (0.80 mole) of para-bromoacetophenone and the mixture is heated unler reflux for 2.5 hours. The aggregate of selenium which begins to precipitate as the mixture is warmed is separated and the solvent is removed through a simple Claisen head at forty millimeters' pressure. From the residue is distilled 129 grams (73 percent of the theoretical amount) of para-bromophenylglyoxal [para-Br—$C_6H_4$—COCHO] as a mixture of yellow oil and white crystals, boiling point 100–105 degrees centigrade at three millimeters.

Para-bromophenylglyoxal is converted to the crystalline hemihydrate by dissolving in 200 milliliters of boiling benzene, adding twenty milliliters of water and shaking. Crystallization is very rapid, evolving enough heat to cause the benzene to boil vigorously for a few minutes. The crystals are collected and recrystallized in a similar manner from 300 milliliters of benzene, taking care to cool below twenty degrees centigrade below filtering. More solid is collected from the filtrates. The crystals are pressed nearly dry on the filter, and air dried for several days; melting point 127–130.5 degrees centigrade with decomposition; weight, 96 grams (54 percent of the theoretical amount). Titration by the hydrogen peroxide method indicates 97 percent para-bromophenylglyoxal hemihydrate [para-Br—$C_6H_4$—COCHO·½$H_2O$].

Example 17

In a one-liter Erlenmeyer flask 38 grams (0.17 mole) of para-bromophenylglyoxal hemihydrate is dissolved in 250 milliliters of tetrahydrofuran and a solution of 17.7 grams (0.17 mole) of sodium bisulfite in 170 milliliters of water is added. The fine white crystals which separate rapidly are digested on the steam bath for thirty minutes, cooled, collected, washed with tetrahydrofuran and dried, giving 43 grams, plus four grams obtained from the filtrate, a total of 47 grams (87 percent of the theoretical amount) of para-bromophenylglyoxal sodium bisulfite addition compound

[para-Br—$C_6H_4$—COCHO·$NaHSO_3$]

Titration after oxidation with hydrogen peroxide requires 3.02 equivalents of base per mole whereas theoretical is 3.00.

*Analysis.*—Calcd. for $C_8H_6BrNaO_5S$: C, 30.30; H, 1.91; S, 10.11. Found: C, 30.05; H, 2.18; S, 10.37.

Example 18

3-methoxy-4-hydroxyacetophenone (acetovanillone) is oxidized according to the Arnfelt procedure of Example 13, yielding ninety percent of theory of precipitated selenium. Attempted distillation causes decomposition of the 3-methoxy-4-hydroxyphenylglyoxal

[4-HO(3-$CH_3O$)—$C_6H_3$—COCHO]

3-methoxy-4-hydroxyphenylglyoxal hydrate

[4-HO(3-$CH_3O$)—$C_6H_3$—COCHO·$H_2O$]

is prepared by dissolving undistilled material in hot water and allowing it to crystallize upon standing, melting point 98–100 degrees centigrade.

*Analysis.*—Calcd. for $C_9H_{10}O_5$: C, 54.54; H, 5.09. Found: C, 54.48; H, 4.86.

Example 19

In a two-liter, round-bottomed, three-necked flask, fitted with stirrer, reflux condenser (protected by a calcium chloride drying tube), dropping funnel, and nitrogen inlet, is placed 9.72 grams (1.4 moles) of finely cut lithium wire and 400 milliliters of absolute ether. In the dropping funnel is placed a solution of 140 grams (0.7 mole) of twice redistilled para-bromodimethylaniline in 300 milliliters of absolute ether. A little of this solution is run into the flask and the reaction is started by adding a little methyl lithium and heating under reflux. The rest of the solution is added at such a rate that the ether refluxes smoothly. When all the lithium has reacted, 107.5 grams (0.5 mole) of diethoxyacetylpiperidide

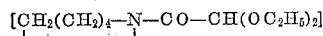

is added at such a rate that the ether refluxes gently. After the addition is complete the mixture is heated under reflux for two hours more. After standing overnight in the refrigerator the reaction mixture is added to ice water containing forty milliliters of acetic acid. The aqueous layer is separated and extracted twice with ether. The combined ether solution is washed twice with water, then with saturated sodium chloride solution, and dried over anhydrous sodium sulfate. The ether is removed and the product is distilled through a six inch (⅛ inch helices) column; boiling point 135 degrees centigrade at 0.05 millimeter; giving 114 grams (90.7 percent of the theoretical amount) of a viscous yellow liquid; $n_D^{25}$ 1.5763. On standing in the refrigerator the para-dimethylaminophenylglyoxal diethylacetal

[para-$(CH_3)_2$N—$C_6H_4$—CO—CH$(OC_2H_5)_2$]

crystallizes solid, melting point 33-37 degrees centigrade. A sample is recrystallized from Skellysolve A. Part of it oils out and then solidifies but more crystals separate from the solution on standing in the refrigerator. These latter crystals are collected and dried, melting point 37-38 degrees centigrade.

*Analysis.*—Calcd. for $C_{14}H_{21}NO_3$: C, 66.90; H, 8.42; N, 5.57. Found: C, 66.71; H, 8.80; N, 5.53.

Example 20

To seventeen grams of crude para-dimethylaminophenylglyoxal diethylacetal is added 175 milliliters of dilute hydrochloric acid (17.5 milliliters of concentrated acid in 175 milliliters of solution). The air in the flask is displaced with nitrogen, the flask is stoppered and shaken until all the acetal is dissolved, giving a dark green solution. After standing at room temperature for 41 hours a few milliliters of concentrated hydrochloric acid is added and the solution is cooled with ice and extracted with ether. The aqueous solution is neutralized to pH 6 by slowly adding dilute sodium hydroxide solution while keeping the mixture cold by the addition of ice. The precipitate is collected, washed with water and dried in a vacuum desiccator giving 12.6 grams of brown solid. Recrystallization from about fifty milliliters of methanol gives 6.53 grams (46 percent of the theoretical amount) of yellow crystals, melting point 103-108 degrees centigrade with decomposition (on block). The purest fraction of the para-dimethylaminophenylglyoxal methylhemiacetal

[para-$(CH_3)_2$N—$C_6H_4$—CO—CH(OH)OCH$_3$]

after several recrystallizations from methanol, has a melting point of about 105-109 degrees centigrade with decomposition (on block) or about 118-122 degrees centigrade with decomposition (in capillary tube), after starting to turn orange color at about 100 degrees centigrade.

*Analysis.*—Calcd. for $C_{11}H_{15}NO_3$: C, 63.14; H, 7.23; N, 6.70; OCH$_3$, 14.83. Found: C, 63.54; H, 7.15; N, 6.95; OCH$_3$, 13.84.

Hydrolysis of para-dimethylaminophenylglyoxal diethylacetal with ten percent hydrochloric acid and avoiding the use of alcohols for recrystallization provides para-dimethylaminophenylglyoxal

[para-$(CH_3)_2$N—$C_6H_4$—COCHO]

Example 21

A suspension of 111 grams (one mole) of selenium dioxide in twenty milliliters of water and 600 milliliters of dioxane in a two-liter reaction flask is warmed until the selenium dioxide dissolves, and then 126 grams (one mole) of cyclohexyl methyl ketone is added. The mixture is heated under reflux with stirring for four and one-half hours during which time 68.5 grams (87 percent of the theoretical amount) of selenium separates. After filtering, the solvent is removed by distillation through a column at about seventy millimeters pressure and a bath temperature up to 110 degrees centigrade. The column is then removed and the residue of cyclohexylglyoxal [$C_6H_{11}$—COCHO] is distilled through a Claisen head. The first fraction (about 25 milliliters) contains considerable solvent, boiling point 41 to seventy degrees centigrade at 12.5 millimeters. The second fraction (72.3 grams) is a partly crystalline yellow material, boiling point seventy to 76 degrees centigrade at fourteen millimeters. Each fraction is heated with water (about 400 milliliters for the first fraction, and one liter for the second fraction) on a steam bath for one hour. Neither fraction dissolves, but on cooling and standing the oil solidifies to a light yellow solid. The two fractions are combined and the solid is collected on a filter, washed well with Skellysolve A, and dried, giving 70.3 grams (47 percent of the theoretical amount) of cyclohexylglyoxal hemihydrate [$C_6H_{11}$—COCHO·½$H_2O$] as a white solid. The melting point depends somewhat on the rate of heating; in a tube it is about 110-120 degrees centigrade and on a block about 116-128 degrees centigrade.

Example 22

To a filtered solution of 3.5 grams (0.023 mole) of cyclohexylglyoxal hemihydrate in fifty milliliters of ethanol is added 6.5 milliliters of an aqueous solution of commercial sodium bisulfite containing 0.026 mole of sodium bisulfite. On shaking a few minutes the mixture becomes nearly solid. After standing for one hour the precipitate is collected, and washed with alcohol. This precipitate is recrystallized from about 25 milliliters of water, giving 4.65 grams (76 percent of the theoretical amount) of cyclohexylglyoxal sodium bisulfite addition compound as a white crystalline solid, melting point 179-180 degrees centigrade with decomposition.

Example 23

An aqueous solution containing five percent para-hydroxyphenylglyoxal sodium bisulfite addition compound and 0.2 percent sodium lauryl sulfate is prepared. This solution is used for spraying poultry yards known to be contaminated with Newcastle's virus to achieve virus decontamination.

Example 24

A dust is prepared by thoroughly mixing 100 parts by weight of pyrophyllite and two parts by weight of 3-methoxy-4-hydroxyphenylglyoxal hydrate. This dust is spread in a fine layer on the floor of a poultry house which is being prepared to receive a brood of young chicks as a prophylactic measure to prevent virus infections. Following the foregoing procedure, but substituting 4-amino-2-naphthyl-, 4-fluoro-2-naphthyl-, 4-hydroxymethyl-2-naphthyl-, 4-trichloromethyl-2-naphthyl-, 4-mercapto-2-naphthyl-, 4-methylmercapto-2-naphthyl-, 4-sulfo-2-naphthyl-, 4-iodi-2-naphthyl-, 4-ethylsulfonyl-2-naphthyl-, 4-methoxyphenyl-, 4-propenylphenyl-, mesityl-, 4-iodophenyl-, 4-carboxymethylphenyl-, 4-cyanomethylphenyl-, 2-($\beta$-hydroxyethyl)-phenyl-, 3-chloromethylphenyl-, 3-dichloromethylphenyl-, 4-($\beta$-nitroethyl)-phenyl-, 3,4-methylenedioxyphenyl-, 4-formylphenyl-, 4-fluoromethylphenyl-, 4-bromomethylphenyl-, 4-glyoxylphenyl-, 4-sulfamylphenyl-, 3-selenonophenyl-, 4-isothiocyanophenyl-, 4-phosphonophenyl-, 4-sulfaminophenyl-, 4-carbamidophenyl-, 4-arsonophenyl-, 4-chloromercuriphenyl-, 4-thiocyanophenyl-, or 4-methoxybenzylglyoxal, or a sodium or potassium bisulfite or hydrate derivative thereof, for the 3-methoxy-4-hydroxyphenylglyoxal hydrate provides other dusts useful for the same purpose.

Example 25

An aerosol bomb containing five percent by weight of cyclopentylglyoxal and 95 percent by weight of Freon 12, the total weight being four ounces, is prepared. The bomb is discharged in a closed sick room previously occupied by a patient having mumps, care being taken to avoid inhalation by the operator, and the room is kept closed for several hours to achieve virus decontamination. The room is then aired to remove excess aerosol before use. By substituting in the foregoing procedure cyclopentyl-, cyclohexyl-, cycloheptyl-, $\beta$-decahydronaphthyl-, 1-acenaphthenyl-, cyclopentylmethyl-, $\alpha$ and $\beta$-cyclohexylbutyl-, $\omega$-cyclopentylhexyl-, $\alpha$ and $\beta$-cyclohexylisopropyl-, 1-cycloheptenyl-, 1-cyclopentenyl-, $\beta$-(1-cyclohexenyl)-ethyl-, or $\omega$-(1-cyclopentyl)-propylglyoxal for the cyclopentylglyoxal other aerosol bombs useful for the same purpose are prepared.

Example 26

A one percent solution of para-hydroxyphenylglyoxal sodium bisulfite addition compound in sterile water is prepared. Surgical instruments are immersed in this solution at room temperature for about one hour to achieve virus decontamination. Other sterilizing solutions are prepared according to the above procedure by substituting the sodium or potassium bisulfite addition compound of 3-hydroxy-1-cyclohexyl-, 3-acetoxy-1-cyclohexyl-, 3-chloro-1-cyclohexyl-, 3-bromo-1-cyclohexyl-, or 2-acetylamino-1-cyclopentylmethylglyoxal for the para-hydroxyphenylglyoxal sodium bisulfite addition compound.

Example 27

An aqueous solution containing two percent cyclohexylglyoxal sodium bisulfite addition compound and 0.1 percent sodium lauryl sulfate is prepared. A dog kennel previously housing a dog suffering from distemper is sprayed or washed with this solution to achieve virus decontamination.

Example 28

A sterile aqueous solution containing one percent 2-furylglyoxal hydrate and one percent phenol is prepared. Surgical instruments are immersed in this solution for about one hour at room temperature to achieve virus and bacterial decontamination. Sterile solutions containing a sodium or potassium bisulfite or hydrate derivative of 3-nitro-2-furyl-, 3-cyano-2-furyl-, 2-nitromethyl-2-furyl-, 4-carboxy-2-pyridyl-, 4-carbethoxy-2-pyridyl-, 4-carbamyl-2-pyridyl-, or 1-acetyl-3-indolylglyoxal in place of 2-furylglyoxal hydrate are prepared by the same procedure and are useful for the same purpose.

Example 29

A dust is prepared by mixing two parts by weight of methyl para-glyoxylbenzoate hydrate, 0.2 part by weight of sodium lauryl sulfate, and 100 parts by weight of pyrophyllite. This dust is spread over tobacco-growing land which produces tobacco infected with tobacco mosaic virus in order to achieve virus decontamination of the soil. Other dusts suitable for the same purpose are prepared by substituting 2-furyl-, 2-thienyl-, β-pyridyl-, 3-indolyl-, 2-morpholyl-, β-thionaphthenyl-, ω-(2-furyl)-ethyl-, ω-(2-furyl)-hexyl-, α and β-naphthyl-, α and β-naphthylmethyl-, β-phenylethyl-, β-phenylisopropyl-, or α-phenylethylglyoxal, or a sodium or potassium bisulfite or hydrate derivative thereof, for the methyl para-glyoxylbenzoate hydrate in the foregoing procedure.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A method for virus prophylaxis and decontamination of materials and areas comprising treating said materials and areas with a cyclic glyoxal, said cyclic glyoxal having the following general structural formula:

$$R-\overset{O}{\underset{\|}{C}}-\overset{O}{\underset{\|}{C}}-H$$

wherein R is selected from the group consisting of (1) cyclopentyl, cyclohexyl, benzyl, furyl, thienyl, hydroxyphenyl, dihydroxyphenyl, methoxyphenyl, dimethoxyphenyl, hydroxy- and methoxyphenyl, carboxyphenyl, carbomethoxyphenyl, nitrophenyl, chlorophenyl, and bromophenyl; (2) sodium and potassium bisulfite addition compounds; and (3) hydrates thereof.

2. A method for virus prophylaxis and decontamination of materials and areas comprising contacting said materials and areas with an anti-viral composition containing a cyclic glyoxal dispersed in a carrier therefor selected from the group consisting of: (1) liquid carrier with surface-active agent; (2) gaseous carrier with surface-active agent; and (3) solid carrier, said cyclic glyoxal having the following general structural formula:

$$R-\overset{O}{\underset{\|}{C}}-\overset{O}{\underset{\|}{C}}-H$$

wherein R is selected from the group consisting of (1) cyclopentyl, cyclohexyl, benzyl, furyl, thienyl, hydroxyphenyl, dihydroxyphenyl, methoxyphenyl, dimethoxyphenyl, hydroxy- and methoxyphenyl, carboxyphenyl, carbomethoxyphenyl, nitrophenyl, chlorophenyl, and bromophenyl; (2) sodium and potassium bisulfite addition compounds and (3) hydrates thereof.

3. An anti-viral composition comprising a cyclic glyoxal, as defined in claim 1, water and surface-active agent.

4. An anti-viral composition comprising a cyclic glyoxal as defined in claim 1 and sterile water.

5. An anti-viral composition comprising a cyclic glyoxal dispersed in a carrier therefor selected from the group consisting of: (1) liquid carrier with surface-active agent; (2) gaseous carrier with surface-active agent; and (3) solid carrier, said cyclic glyoxal having the following general structural formula:

$$R-\overset{O}{\underset{\|}{C}}-\overset{O}{\underset{\|}{C}}-H$$

wherein R is selected from the group consisting of (1) cyclopentyl, cyclohexyl, benzyl, furyl, thienyl, hydroxyphenyl, dihydroxyphenyl, methoxyphenyl, dimethoxyphenyl, hydroxy- and methoxyphenyl, carboxyphenyl, carbomethoxyphenyl, nitrophenyl, chlorophenyl, and bromophenyl; (2) sodium and potassium bisulfite addition compounds and (3) hydrates thereof.

6. An anti-viral composition comprising para-hydroxyphenylglyoxal, water and surface-active agent.

7. An anti-viral composition comprising 2-furylglyoxal hydrate, water and surface-active agent.

8. An anti-viral composition comprising cyclopentylglyoxal sodium bisulfite addition compound, water and surface-active agent.

9. An anti-viral composition comprising para-carboxyphenylglyoxal hydrate, water and surface-active agent.

10. An anti-viral composition comprising para-hydroxyphenylglyoxal hydrate, water and surface-active agent.

11. A method for virus prophylaxis and decontamination of materials and areas comprising contacting said materials and areas with an anti-viral composition containing 0.001 to ten percent of a cyclic glyoxal having the following general structural formula:

$$R-\overset{O}{\underset{\|}{C}}-\overset{O}{\underset{\|}{C}}-H$$

wherein R is selected from the group consisting of (1) cyclopentyl, cyclohexyl, benzyl, furyl, thienyl, hydroxyphenyl, dihydroxyphenyl, methoxyphenyl, dimethoxyphenyl, hydroxy- and methoxyphenyl, carboxyphenyl, carbomethoxyphenyl, nitrophenyl, chlorophenyl, and bromophenyl; (2) sodium and potassium bisulfite addition compounds; and (3) hydrates thereof dispersed in a carrier therefor selected from the group consisting of: (1) liquid carrier with surface-active agent; (2) gaseous carrier with surface-active agent; and (3) solid carrier.

12. An anti-viral composition comprising 0.001 to ten percent of a cyclic glyoxal having the following general structural formula:

$$R-\overset{O}{\underset{\|}{C}}-\overset{O}{\underset{\|}{C}}-H$$

wherein R is selected from the group consisting of (1) cyclopentyl, cyclohexyl, benzyl, furyl, thienyl, hydroxyphenyl, dihydroxyphenyl, methoxyphenyl, dimethoxyphenyl, hydroxy- and methoxyphenyl, carboxyphenyl, carbomethoxyphenyl, nitrophenyl, chlorophenyl, and bromophenyl; (2) sodium and potassium bisulfite addition compounds; and (3) hydrates thereof, dispersed in a carrier therefor selected from the group consisting of: (1) liquid carrier with surface-active agent; (2) gaseous carrier with surface-active agent; and (3) solid carrier.

References Cited in the file of this patent

UNITED STATES PATENTS

| | | |
|---|---|---|
| 1,955,890 | Riley | Apr. 24, 1934 |
| 2,359,280 | Anderson | Oct. 3, 1944 |
| 2,560,531 | Kipnis et al. | July 17, 1951 |
| 2,775,067 | Meuli | Dec. 25, 1956 |

OTHER REFERENCES

Horsfall: Fung. Insect. and Their Actions, vol. II, 1945, pp. 145–148.

J. Am. Chem. Soc., vol. 71, 1949, pp 1045–1048.